(12) United States Patent
Kendrick et al.

(10) Patent No.: US 10,550,499 B2
(45) Date of Patent: Feb. 4, 2020

(54) FABRICATING COMPOSITE CORE WITH WOVEN COMPOSITE FIBERS

(71) Applicant: Bell Helicopter Textron Inc., Fort Worth, TX (US)

(72) Inventors: Phillip Kendrick, Fort Worth, TX (US); Kathleen Oldham, Fort Worth, TX (US); Levi Armstrong, Kerrville, TX (US); Elizabeth Oberle, Keller, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 56 days.

(21) Appl. No.: 15/410,416

(22) Filed: Jan. 19, 2017

(65) Prior Publication Data
US 2018/0202081 A1    Jul. 19, 2018

(51) Int. Cl.
| | |
|---|---|
| B32B 41/00 | (2006.01) |
| D03D 25/00 | (2006.01) |
| B29C 70/24 | (2006.01) |
| B29C 70/48 | (2006.01) |
| B29D 99/00 | (2010.01) |
| B29D 24/00 | (2006.01) |

(52) U.S. Cl.
CPC ............ *D03D 25/005* (2013.01); *B29C 70/24* (2013.01); *B29C 70/48* (2013.01); *B29D 24/001* (2013.01); *B29D 99/0089* (2013.01)

(58) Field of Classification Search
CPC ........ D03D 25/005; B29C 70/24; B29C 70/48
USPC .......................... 156/64, 350, 351, 378, 379
See application file for complete search history.

(56) References Cited

U.S. PATENT DOCUMENTS

| | | | |
|---|---|---|---|
| 2002/0056484 A1* | 5/2002 | Uchida | D03D 11/02 139/383 R |
| 2012/0021165 A1 | 1/2012 | Hethcock | |
| 2015/0037533 A1* | 2/2015 | Kendrick | B32B 3/12 428/118 |

* cited by examiner

*Primary Examiner* — Michael N Orlando
*Assistant Examiner* — Joshel Rivera
(74) *Attorney, Agent, or Firm* — Daniel J. Chalker; Edwin S. Flores; Chalker Flores, LLP

(57) ABSTRACT

In the present disclosure, a method may include forming a three-dimensional composite fiber pre-form by three-dimensionally weaving a plurality of composite fibers. The composite fiber pre-form includes a plurality of open cells formed adjacent to and interlocked with each other, and a composite fiber forms at least a portion of a first side of a first open cell and at least a portion of a second side of a second open cell. The first open cell and the second open cell are adjacent to and interlocked with each other.

18 Claims, 10 Drawing Sheets

FABRICATING COMPOSITE CORE WITH WOVEN COMPOSITE FIBERS

CROSS-REFERENCE TO RELATED APPLICATIONS

Not applicable.

STATEMENT OF FEDERALLY FUNDED RESEARCH

Not applicable.

TECHNICAL FIELD OF THE INVENTION

This disclosure relates to fabricating composite core, for example, using woven composite fibers.

BACKGROUND OF THE INVENTION

Composite structures, such as composite sandwich structures, are often used because of their high strength-to-weight ratio. Such structures are frequently used in the manufacture of aircraft, such as airplanes, helicopters, and the like. Composite sandwich structures typically include an upper skin, a lower skin, and a core adhesively bonded between the upper skin and the lower skin. The upper and lower skins are made of a composite material, such as carbon, graphite, glass fibers, or the like disposed in a polymeric matrix, such as epoxy, polyetheretherketone, or the like. The core often comprises a honeycomb structure made from resin-infused paper. The strength of a conventional sandwich structure is determined by the strength of the core.

SUMMARY OF THE INVENTION

This disclosure describes technologies relating to fabricating composite core with woven, for example, three-dimensionally woven, composite fibers.

In one embodiment, the present invention includes a method comprising: forming a three-dimensional composite fiber pre-form by three-dimensionally weaving a plurality of composite fibers, the composite fiber pre-form comprising a plurality of open cells formed adjacent to and interlocked with each other, wherein a composite fiber forms at least a portion of a first side of a first open cell and at least a portion of a second side of a second open cell, the first open cell and the second open cell adjacent to and interlocked with each other. In one aspect, the plurality of composite fibers comprises a first set of fibers oriented in an XZ plane and a second set of fibers oriented in an XY plane, wherein forming the composite fiber pre-form comprises three-dimensionally weaving the second set of fibers through the first set of fibers to form the plurality of open cells in the XZ plane. In another aspect, the first set of fibers and the second set of fibers are oriented at an angle to each other. In another aspect, the angle between the first set of fibers and the second set of fibers is substantially 90 degrees or substantially 45 degrees. In another aspect, the method further comprises forming the three-dimensional composite fiber pre-form by three-dimensionally weaving the plurality of composite fibers comprises, at an intersection of two sides of the first open cell: weaving a first subset of the second set of fibers to form a second side of the first open cell; and weaving a second subset of the second set of fibers to form the second side of the second open cell. In another aspect, the method further comprises controlling a size of each open cell by controlling lengths of fibers in at least one of the first subset of the second set of fibers or the second subset of the second set of fibers. In another aspect, of the method each cell of the plurality of open cells has a nested geometry cross-section. In another aspect, the nested geometry cross-section comprises at least one of a hexagon, a square, a triangle or a combination of at least two of the hexagon, the square or the triangle. In another aspect, the method further comprises inserting a plurality of mandrels through corresponding plurality of open cells; and curing the composite fiber pre-form over the plurality of mandrels. In another aspect, the step of curing the composite fiber pre-form to the plurality of mandrels comprises introducing the composite fiber pre-form with resin.

In another embodiment, the present invention includes a method comprising: orienting a first set of composite fibers in a first direction; orienting a second set of composite fibers in a second direction; and three-dimensionally weaving the first set of composite fibers into the second set of composite fibers to form a three-dimensional composite fiber pre-form comprising a plurality of open cells formed adjacent to and interlocked with each other, wherein a composite fiber of the first set of composite fiber forms at least a portion of a side of each of a first open cell and a second open cell adjacent to and interlocked with the first open cell. In one aspect, the first set of composite fibers is oriented at an angle to the second set of composite fibers, e.g., the angle is substantially 90 degrees or substantially 45 degrees. In another aspect, the step of three-dimensionally weaving the first set of composite fibers into the second set of composite fibers to form the three-dimensional composite fiber pre-form comprises, at an intersection of two sides of the first open cell: weaving a first subset of the first set of fibers to form another side of the first open cell; and weaving a second subset of the first set of fibers to form another side of the second open cell. In another aspect, the method further comprises controlling a size of each open cell by controlling lengths of fibers in at least one of the first subset or the second subset of the first set of fibers. In another aspect, each cell of the plurality of open cells has a nested geometry cross-section comprising at least one of a hexagon, a square, a triangle or a combination of at least two of the hexagon, the square or the triangle. In another aspect, the method further comprises inserting a plurality of mandrels through corresponding plurality of open cells; and curing the composite fiber pre-form to the plurality of mandrels.

In another embodiment, the present invention includes a system comprising: a three-dimensional composite fiber weaving machine; a computer-readable medium storing instructions executable by one or more processors connected to the three-dimensional composite fiber weaving machine, the one or more processors configured to execute the instructions to cause the three-dimensional composite fiber weaving machine to perform operations comprising: forming a three-dimensional composite fiber pre-form by three-dimensionally weaving a plurality of composite fibers, the composite fiber pre-form comprising a plurality of open cells formed adjacent to and interlocked with each other, wherein a composite fiber forms at least a portion of a first side of a first open cell and at least a portion of a second side of a second open cell, the first open cell and the second open cell adjacent to and interlocked with each other. In one aspect, the plurality of composite fibers comprises a first set of fibers oriented in an XZ plane and a second set of fibers oriented in an XY plane, wherein forming the composite fiber pre-form comprises three-dimensionally weaving the second set of fibers through the first set of fibers to form the plurality of open cells in the XZ plane. In another aspect, the first set of fibers and the second set of fibers are oriented at an angle to each other, wherein the angle is substantially 90 degrees or substantially 45 degrees.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
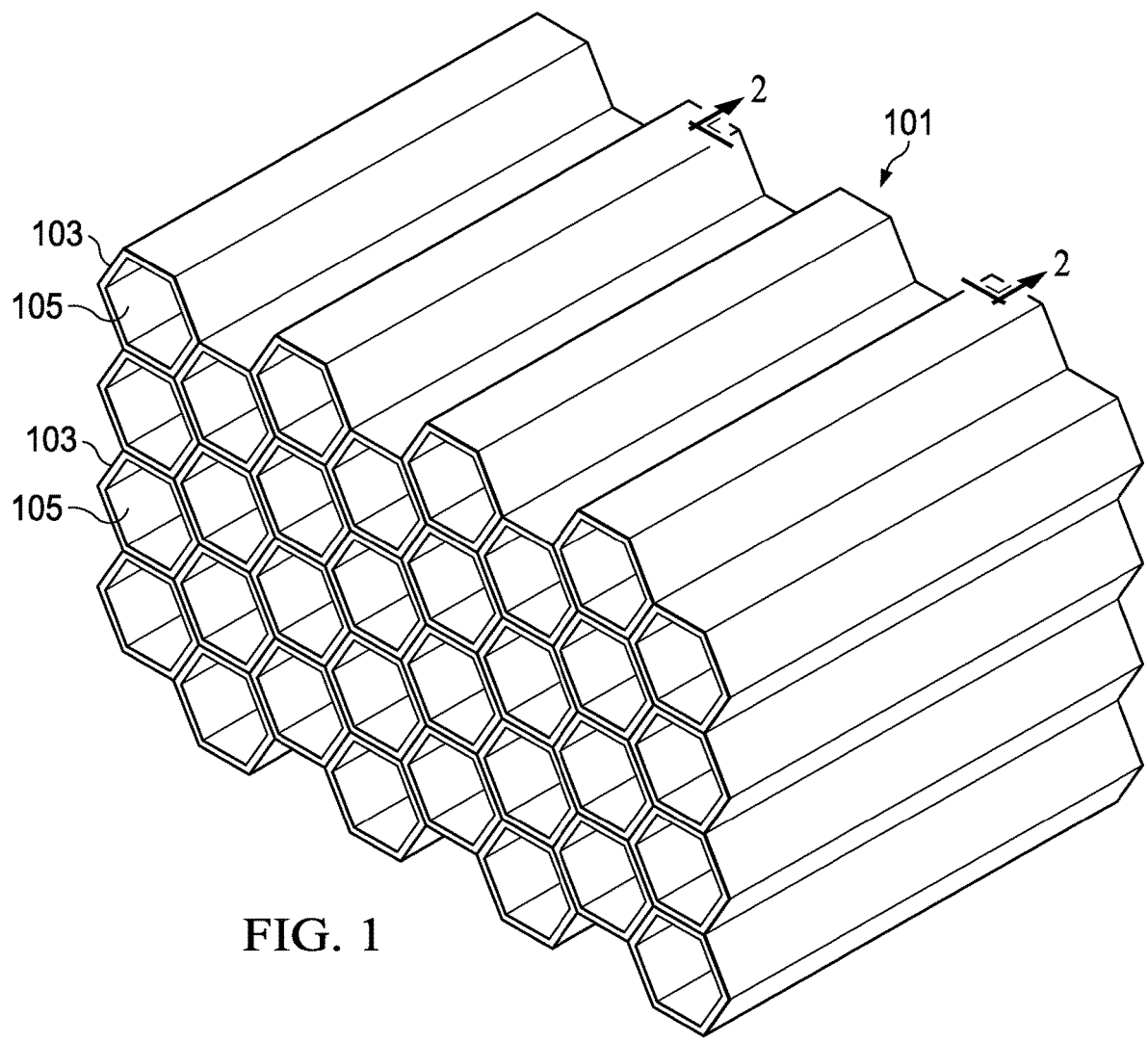
FIG. 1 shows an isometric view of an example of a composite core.

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

This disclosure describes methods and systems to three-dimensionally weave composite fibers for use in composite core fabrication. As described below, the composite fibers can be three-dimensionally woven to form a composite fiber pre-form that includes multiple open cells. At least two or more of the open cells can be interlocked using continuous fibers allowing a single ply of fibers at every discrete cell wall without any overlap. The composite fiber pre-form manufactured using the three-dimensional weaving technique described here can be cured, for example, using traditional Resin Transfer Method (RTM) or Vacuum Assisted Resin Transfer Method (VARTM) process or prepreg tow form. The uncured pre-form can be transported more easily than cured composite core, for example, the pre-form can simply be rolled or flat-stacked and transported for curing at a final location. The dry woven pre-forms can be transported much more easily than cured blocks of core, and can be stored until needed. After curing the woven pre-form, the interlocking cellular walls greatly improve the strength of the resulting core block.

This invention is applicable to any core reinforced sandwich panels, not limited to rotorcraft. Some specific rotorcraft applications include, e.g., body panels, main rotor blades, tail rotor blades, wing structures, flaperon structures, acoustic paneling, aft-body features, tail boom and air-frame structural components. For examples, the present invention can be used with marine vessel superstructure, space-craft structures, vehicle structural components, skin/stringer wing replacement on fixed wing aircraft, etc. This technology also applies to non-conventional industries, such as lightweight fireproof doors, core reinforced marine hulls, automotive chassis structures, impact absorbing structures, etc. For example, the present invention can be used with functional components for the preparation and fabrication of large cell composite core material, including mandrel materials, mandrel geometry, cure approaches, and tool/device construction. The applications of this core material are endless as an extremely low-cost alternative to existing composite core materials, e.g., core-reinforced panels.

FIG. 1 shows an isometric view of an example of a composite, open-celled core 101. Core 101 includes multiple tubes 103 arranged in a two-dimensional array. Each tube 103 defines a passageway or "cell" 105 extending therethrough. Core 101 can include any suitable number, size, cross-sectional shape, and construction of tubes 103, as will be discussed in greater detail below. As discussed below, the composite core 101 is fabricated by three-dimensionally weaving multiple composite fibers to form a composite fiber pre-form and curing the fiber pre-form.

Figure 2:
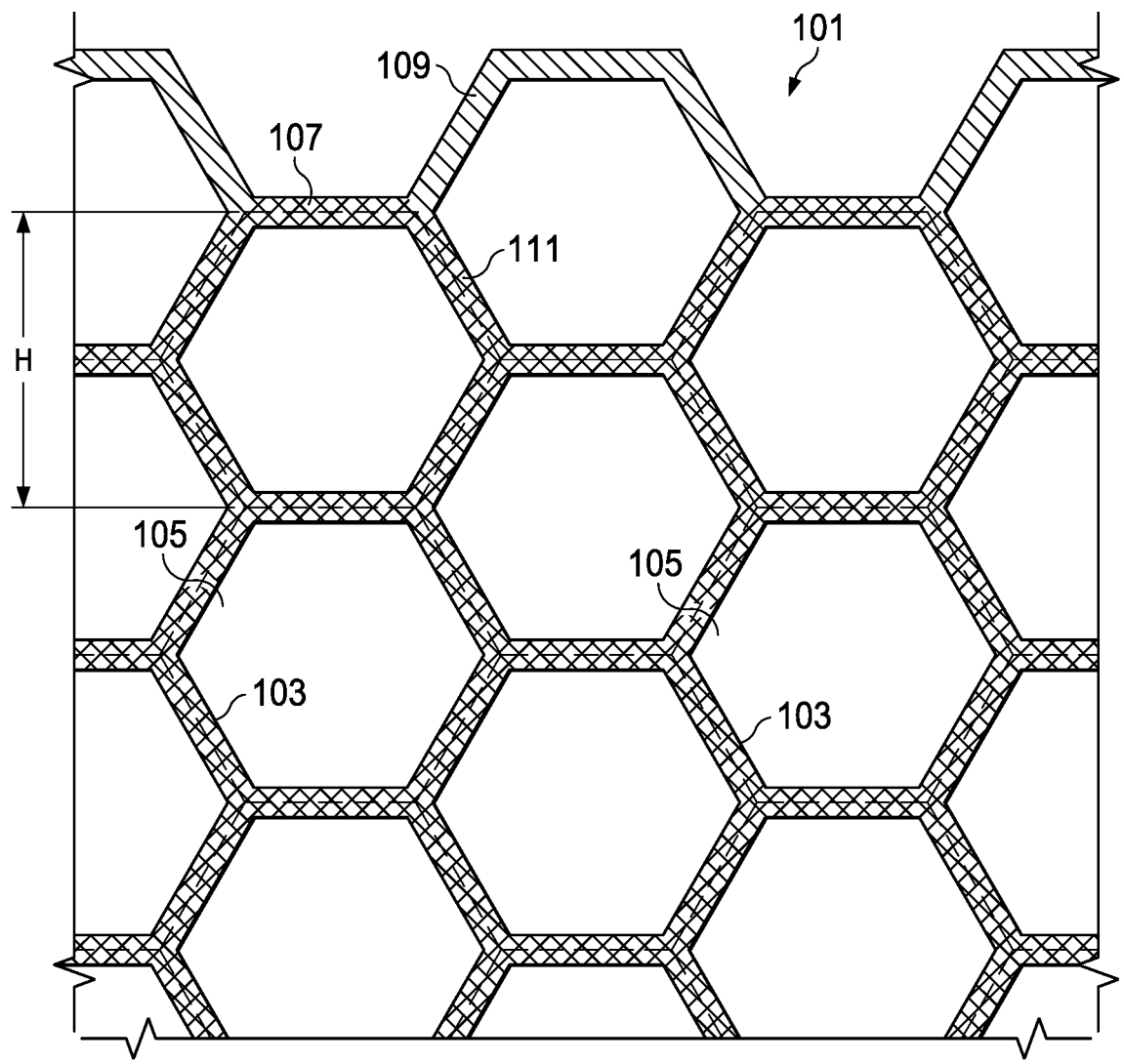
FIG. 2 shows an enlarged, cross-sectional view of a portion of the composite core of FIG. 1 taken along the line 2-2 of FIG. 1.

FIG. 2 shows a cross-sectional view of a portion of core 101 taken along a line 2-2 in FIG. 1. Each of tubes 103 includes multiple reinforcement fibers disposed in a polymeric matrix. For example, tubes 103 can include fibers one or more of carbon, graphite, glass, an aromatic polyamide "aramid") material, a variant of an aromatic polyamide material (e.g., a polyparaphenylene terephthalamide material, such as Kevlar® by E. I. du Pont de Nemours and Company of Richmond, Va.), or the like. Alternatively or in addition, the fibers can include any suitable material or combination of materials. The polymeric matrix can include any suitable thermoplastic or thermosetting resin. Exemplary resins include epoxy, polyimide, polyamide, bismaleimide, polyester, vinyl ester, phenolic, polyetheretherketone (PEEK), polyetherketone (PEK), polyphenylene sulfide (PPS), and the like. FIG. 2 also shows using cross-hatching how two sets of fibers are combined in web 107 that separates in a first direction to form second web 109 and in a second direction to form third web 111.

Figure 3:
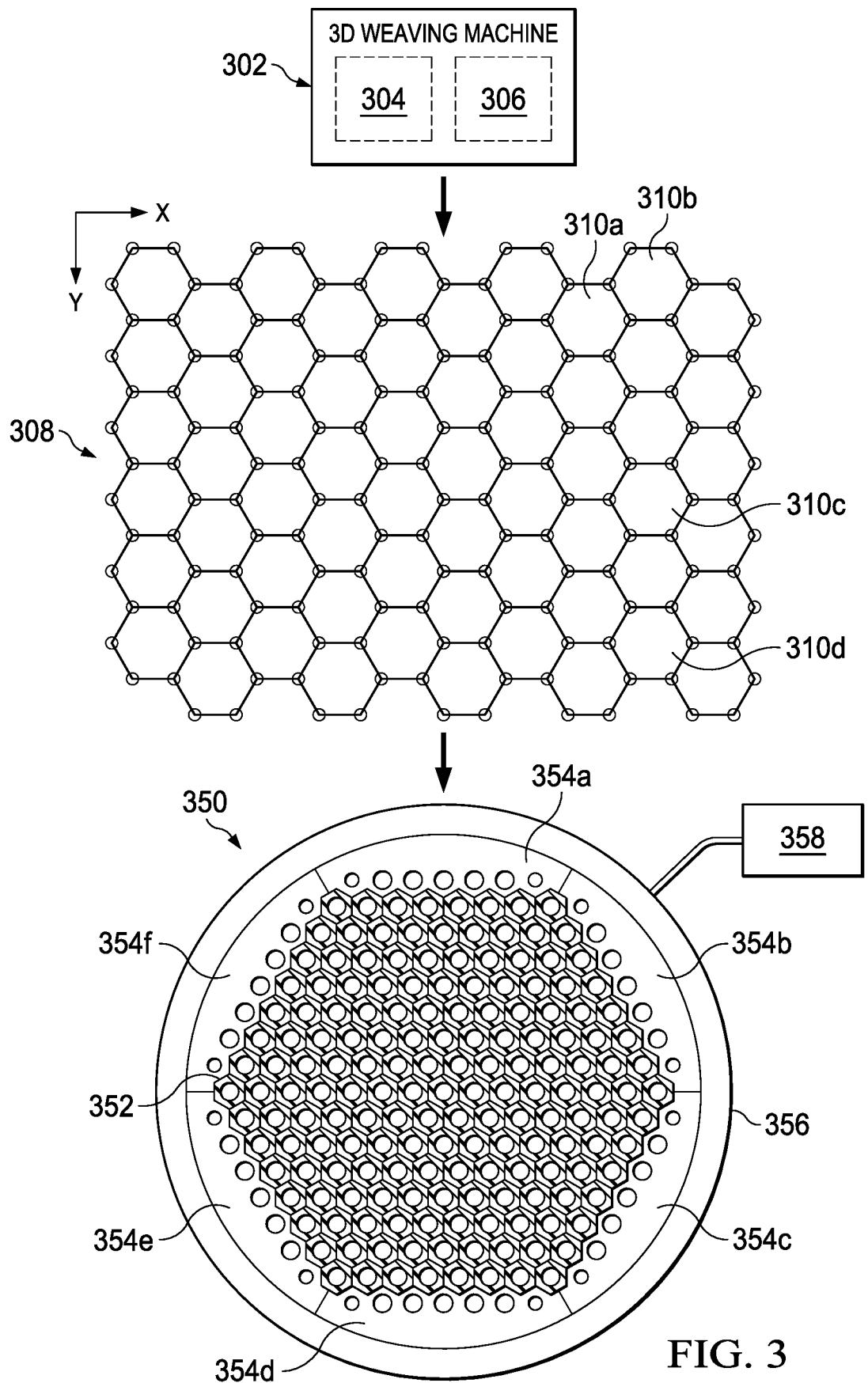
FIG. 3 shows a schematic of an example workflow of manufacturing a composite core using a composite fiber pre-form.
Figure 4:
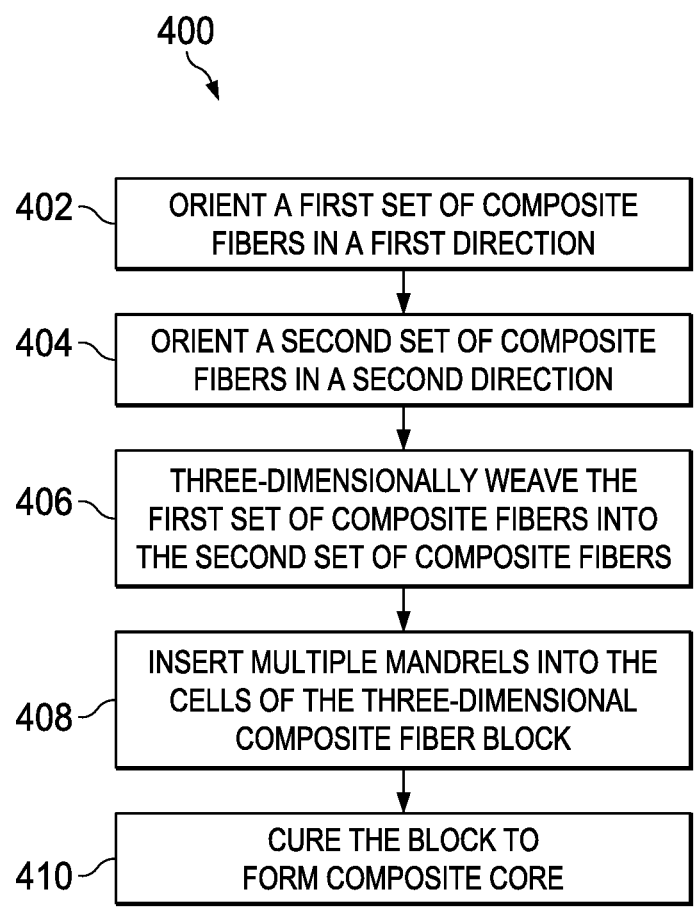
FIG. 4 shows a flowchart of an example process 400 of manufacturing a composite core using a composite fiber pre-form.

FIG. 3 shows a schematic of an example workflow of manufacturing a composite core using a composite fiber pre-form. FIG. 4 is a flowchart of an example process 400 of manufacturing a composite core using a composite fiber pre-form. In some implementations, the process 400 can be implemented using the structures, systems and apparatuses shown in FIG. 3. The composite fiber pre-form can be manufactured using a three-dimensional (3D) composite fiber weaving machine 302. The composite fiber weaving machine 302 can be operated manually to manufacture the composite fiber pre-form, automatically, or semi-automatically. Alternatively or in addition, the composite fiber weaving machine 302 can include or be connected to (or both) a computer-readable medium 304 storing instructions executable by one or more processors (for example, processor 306). The medium 304 can store instructions executable by the one or more processors to cause the composite fiber weaving machine 302 to perform operations described with reference to process 400 to manufacture a composite fiber pre-form (for example, the composite fiber pre-form 308).

As described below, the composite fiber pre-form 308 is formed by three-dimensionally weaving sets of composite fibers. Physical properties of the composite core (for example, a number of open cells, a size of each cell, a thickness of a cell wall, a height of the core, and other physical properties) are determined by properties of the fibers in both sets. The properties of the fibers can include a length of each continuous string of fiber, a number of fibers, a thickness of fibers, and other properties of the fibers. Accordingly, a number, length and type of fibers in each set can be selected based on desired physical properties of the resulting composite tow or course. In some implementations, at 402, a first set of composite fibers is oriented in a first direction, and, at 404, a second set of composite fibers is oriented in a second direction.

Figure 5A:
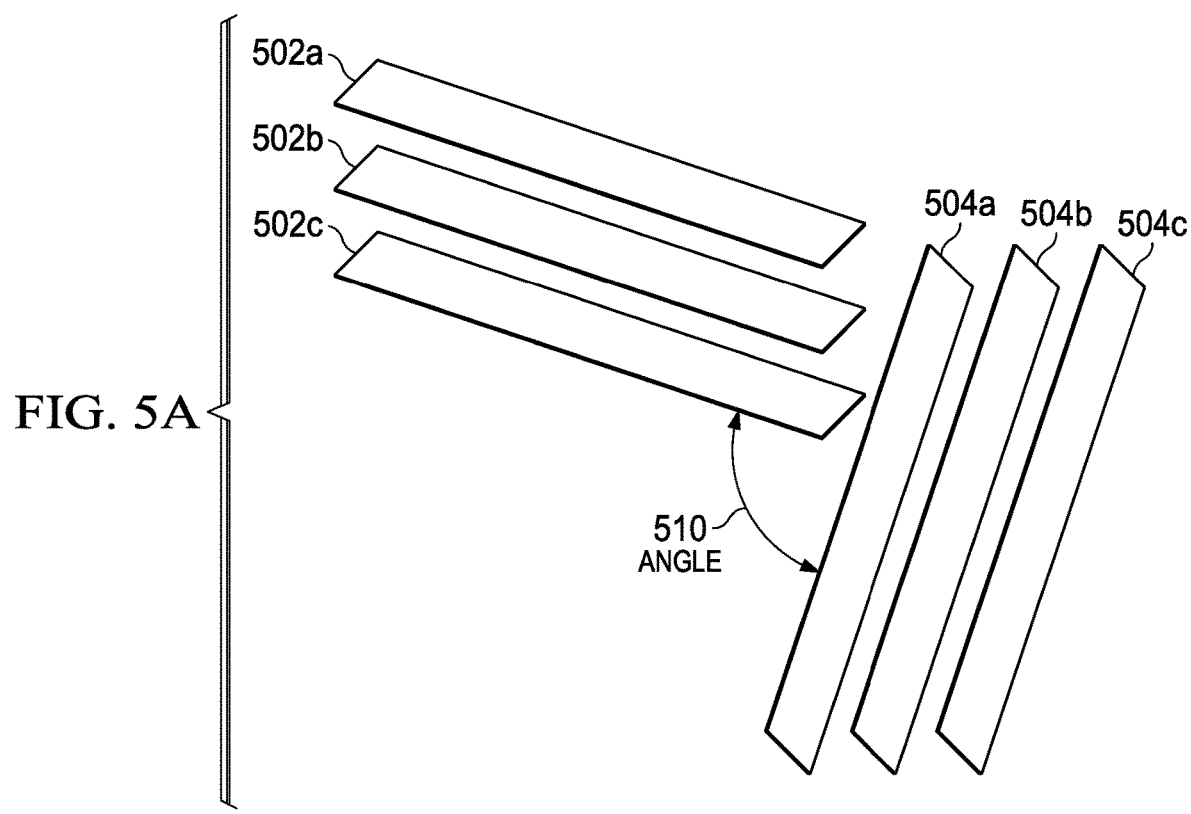
FIGS. 5A-5B show examples of two sets of composite fibers oriented at angles to each other prior to three-dimensional weaving of the composite fiber pre-form.
Figure 5B:
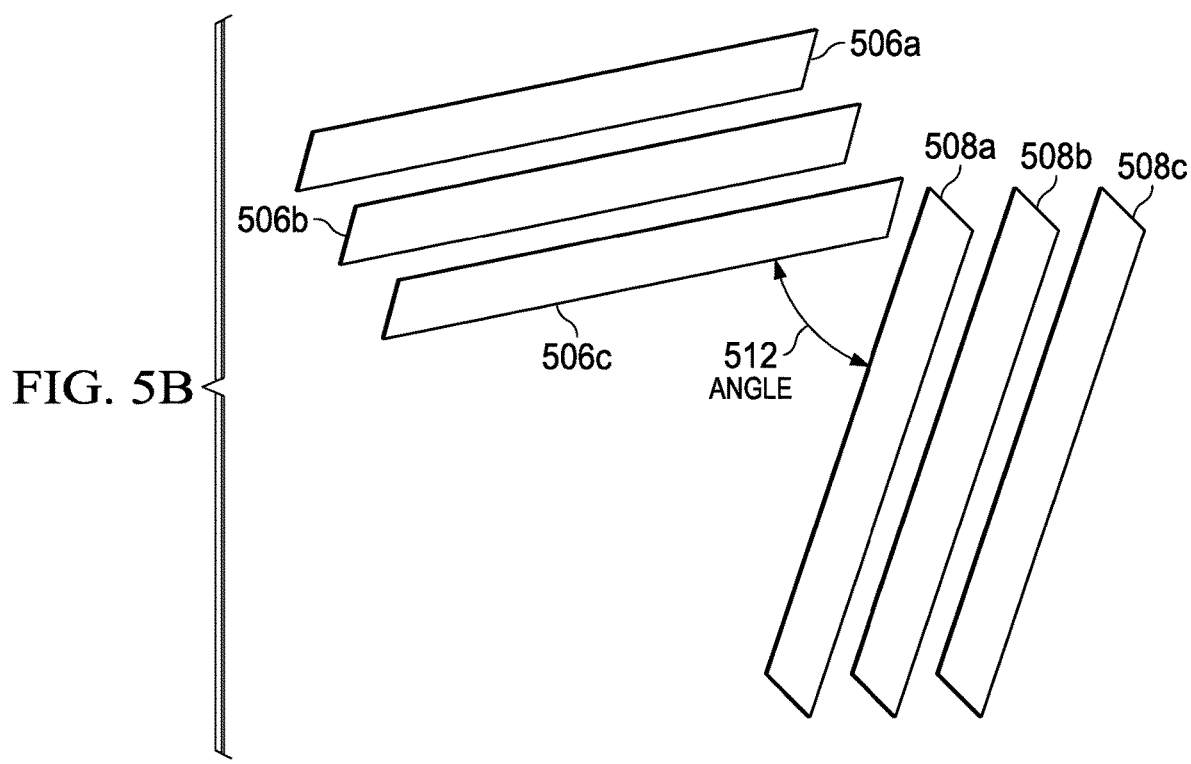

FIGS. 5A and 5B shows examples of two sets of composite fibers oriented at angles to each other prior to three-dimensional weaving of the composite fiber pre-form. For example, the first set of fibers can include fibers 502a, 502b, 502c (and more or fewer fibers), and a second set of fibers can include fibers 504a, 504b, 504c (and more or fewer fibers). In some implementations, the first set of fibers can be oriented at an angle 510 of substantially 90° to the second set of fibers (FIG. 5A). In some implementations, the first set of fibers 506a, 506b, 506c can be oriented at an angle 512 of substantially 45° to the second set of fibers 508a, 508b, 508c (FIG. 5B). Varying the angle of the tows may produce different physical properties (such as compression strength, stiffness, shear strength, etc.). The core sizes, and the angles may be altered. Varying properties may provide a single core reinforced structure that has variable stiffness (which may be controlled by tow angle, cell size, or material). A large-core panel may also be used to absorb energy, if desired, so varying stiffness through the depth of the core (i.e. low stiffness at the surface, and increasing with depth) may allow for tailored impact properties.

At 406, the first set of composite fibers are three-dimensionally woven into the second set of composite fibers to form a 3D composite fiber pre-form (for example, the composite fiber pre-form 308). The resulting composite fiber pre-form is three-dimensional with multiple tubes formed along the Z-axis and multiple open cells formed on the XY plane. On the Z-axis, each tube is interlocked with an adjacent tube by an interweaving of the fibers in the first set and the second set. On the XY plane, each cell is similarly interlocked with an adjacent cell by the interweaving of the fibers in the first set and the second set.

For example, as shown in FIG. 3, the composite fiber pre-form 308 can include multiple open cells (for example, a first cell 310a, a second cell 310b, a third cell 310c, a fourth cell 310d, and more or fewer cells). In particular, the first cell 310a and the second cell 310b are adjacent to and interlocked with each other. The adjacent and interlocked cells share at least one common composite fiber of the first set of composite fibers woven along the XY plane. In this manner, a composite fiber of the first set can form at least a portion of a side of each of a first open cell and a second open cell adjacent to and interlocked with the first open cell. For example, a composite fiber in the first can be shared by at least one side of the first cell 310a and at least one side of the second cell 310b.

To form a side of a cell, the first and second sets of fibers can be interwoven for a length that corresponds to a length of the side of the cell. To form an intersection of two sides of a cell or two sides of any two cells, a direction in which the composite fibers is woven can be varied after interweaving the first and second sets of fibers for the length.

Figure 6:
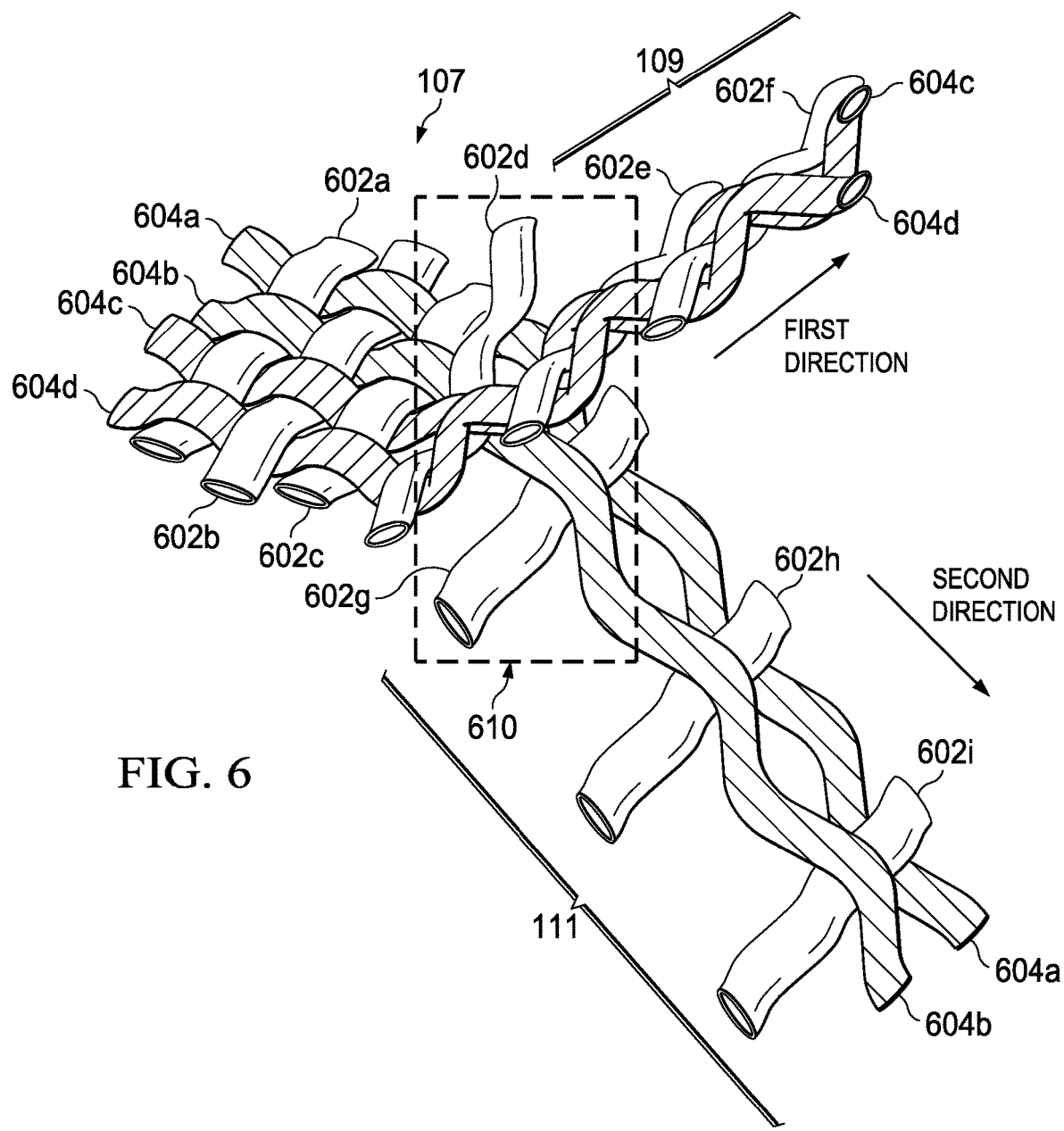
FIG. 6 shows a close-up view of an example of two sets of composite fibers being three-dimensionally woven to form the composite fiber pre-form.

FIG. 6 shows a close-up view of an example of two sets of composite fibers being three-dimensionally woven to form the composite fiber pre-forms, which in conjunction with FIG. 2 shows the first, second and third webs 107, 109, 111, respectively, of a cell. As shown in FIG. 6, at an intersection 610 of two sides of the cell, a first subset (for example, composite fibers 604a and 604b) of the first set of fibers (for example, composite fibers 602c, and 602d) are turned in a first direction to form second web 109 from first web 107, and a second subset (for example, composite fibers 604a and 604b) of the first set of fibers are turned in a second direction that is different from the second direction. An angle between the first and second directions can depend on an angle between edges of the cell to be formed. The first set of fibers can be interwoven with fibers 602a, 602b, 602c and 602d to form first web 107 of an adjacent cell. The first web 107 includes the first and second subset of fibers (604a, 604b and 604c, 604d) that can be interwoven with fibers 602a, 602b, 602c, 602d. The second 109 and third web 111 are formed at intersection 610. The second web 109 is formed by fibers 604a, 604b that are interwoven with fibers 602e and 602f to form (or start forming) the second web 109 of an open cell. The second subset of fibers 604a, 604b are interwoven with fibers 602g, 602h and 602i to form (or start forming) of the third web 111 of the open cell that is adjacent to and interlocked with the first web 107 of an adjacent open cell.

In some implementations, the 3D composite fiber weaving machine 302 can be operated to control a size of each open cell by controlling lengths of fibers in at least one of the first subset or the second subset of the first set of fibers. For example, interweaving a longer length of fibers in the first set of fibers with fibers in the second set of fibers can result in an open cell having a longer side. Comparatively, interweaving a shorter length of fibers in the first set of fibers with fibers in the second set of fibers can result in an open cell having a shorter side. Further, the 3D composite fiber weaving machine 302 can be operated to control a cross-sectional shape of each open cell by controlling an angle between the direction in which the first subset is turned relative to the second subset. For example, turning the two subsets of fibers directly opposite from each other can result in an open cell with a square cross-section.

Figure 7A:
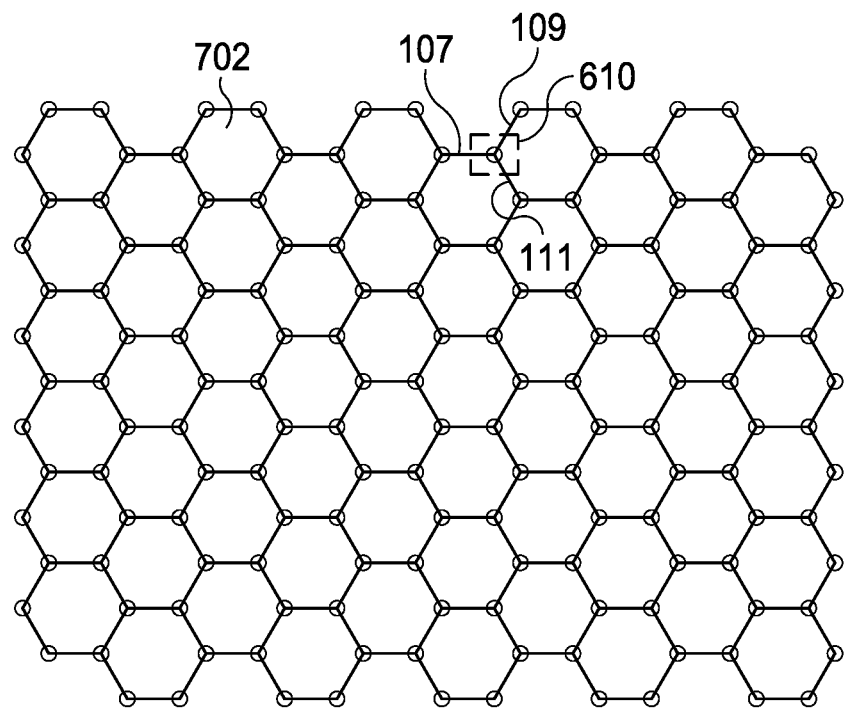
FIGS. 7A-7E show examples of composite fiber pre-forms having cells of different cross-sections.
Figure 7B:
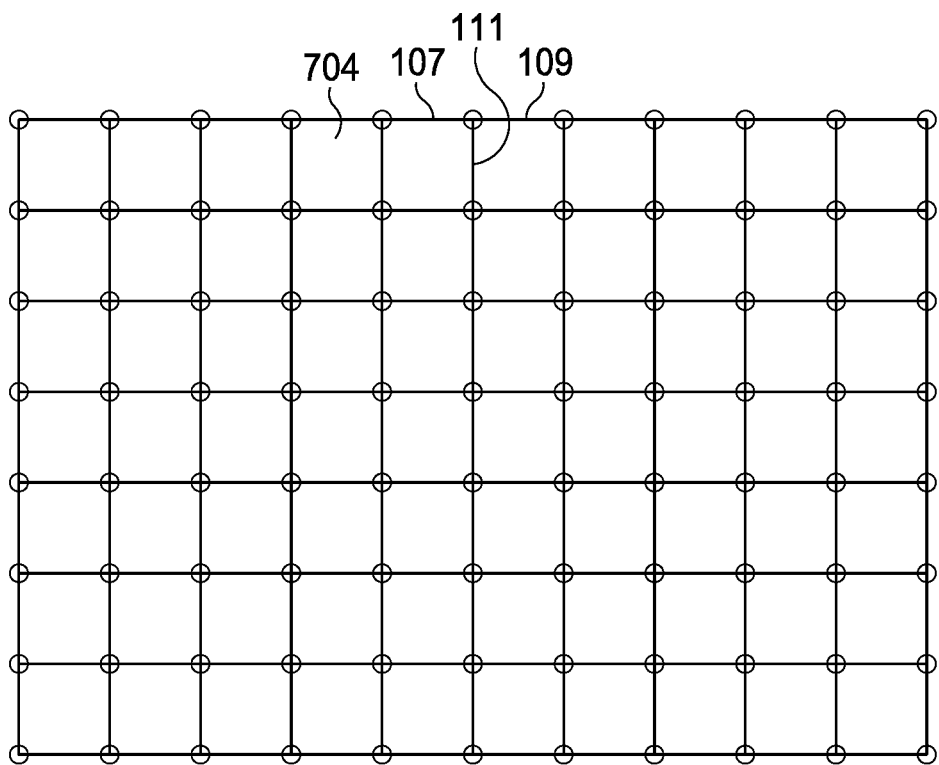
Figure 7C:
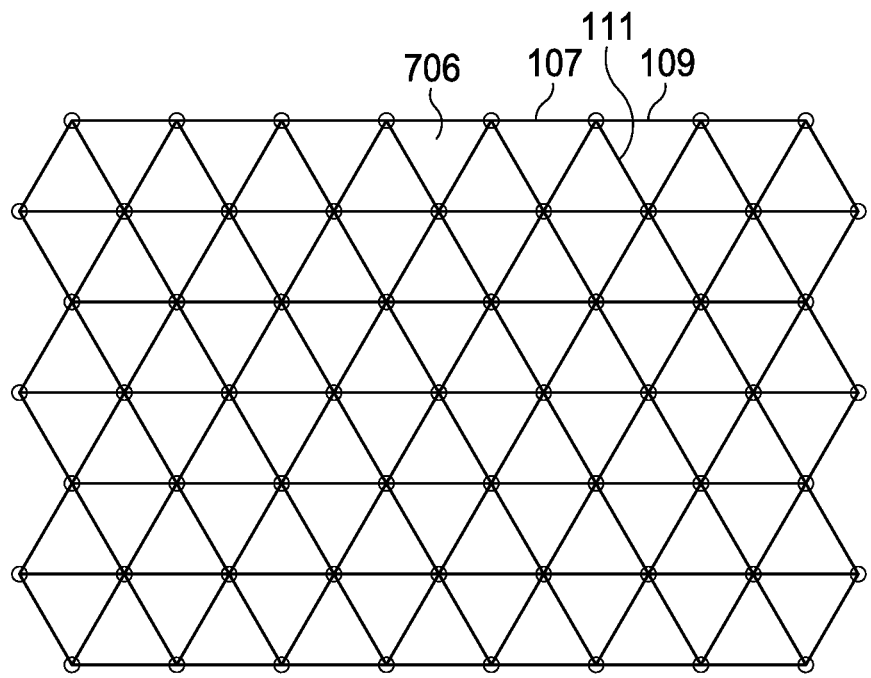
Figure 7D:
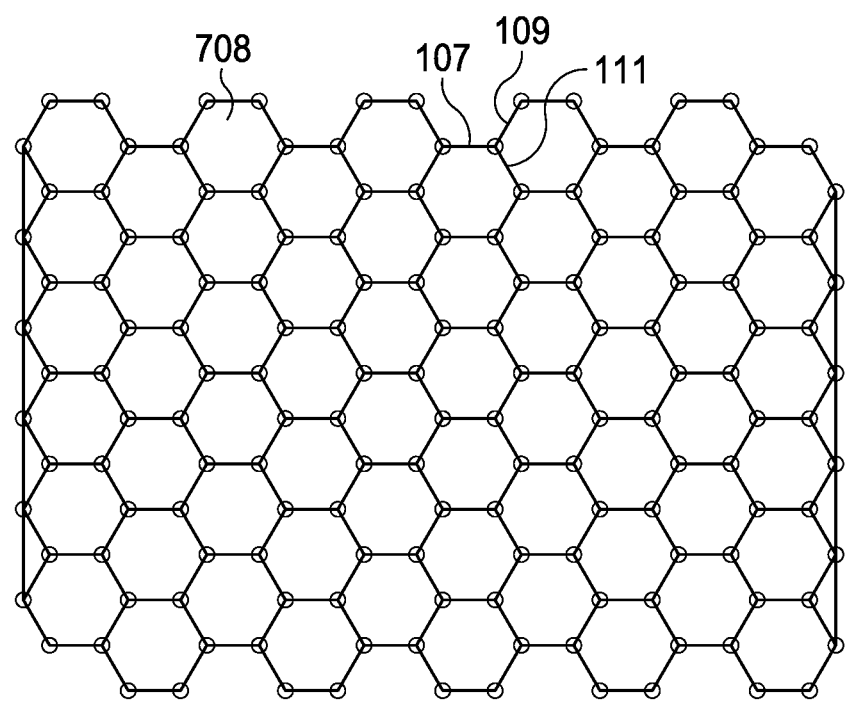
Figure 7E:
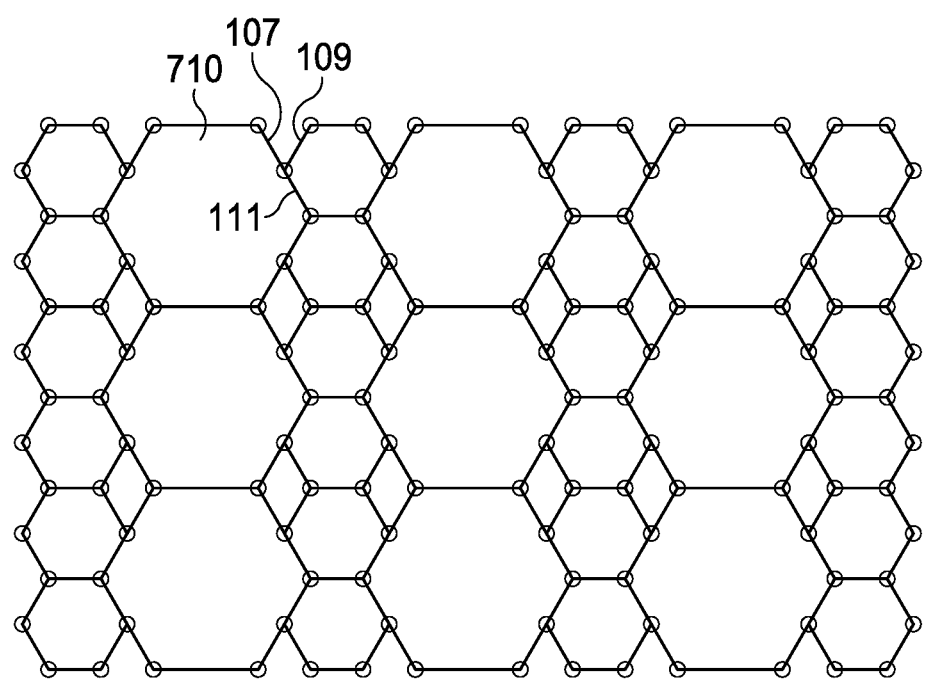

FIGS. 7A-7E show examples of composite fiber pre-forms having cells of different cross-sections. FIG. 7A shows a composite fiber pre-form 702 similar to the composite fiber pre-form 308 having open cells of hexagonal cross-section and shows the exemplary first, second and third webs, 107, 109, 111, respectively (see also FIG. 6). FIG. 7B shows a composite fiber pre-form 704 having open cells of square cross-section and shows the exemplary first, second and third webs, 107, 109, 111, respectively (see also FIG. 6) and intersection 610 with a different angle between the first, second and third webs, 107, 109, 111. FIG. 7C shows a composite fiber pre-form 706 having open cells of triangular cross-section and shows the exemplary first, second and third webs, 107, 109, 111, respectively (see also FIG. 6) with a different angle between the first, second and third webs, 107, 109, 111. FIG. 7D shows a composite fiber pre-form 708 having some open cells with a hexagonal cross-section and other open cells with a triangular cross-section and shows the exemplary first, second and third webs, 107, 109, 111, respectively (see also FIG. 6) with a different angle between the first, second and third webs, 107, 109, 111. FIG. 7E shows a composite fiber pre-form 710 having some open cells larger than others and shows the exemplary first, second and third webs, 107, 109, 111, respectively (see also FIG. 6) with a different angle between the first, second and third webs, 107, 109, 111. As described above, the lengths of the sides and the cross-sections of the open cells can be varied by varying a length and direction of the interweaving. In general, the open cells can be manufactured with any cross-section that has a nested geometry.

The composite fiber pre-form formed by implementing process steps 402-410 is a loose block of interwoven composite fiber shaped like multiple open interlocked composite tubes. The tubes are connected, not by resin or other adhesive, but by composite fibers that are shared by multiple sides of the multiple tubes. In this configuration, the loose block of composite fiber can be transported, for example, by rolling or folding or flat-stacking, to another location for further processing. Examples of further processing can include forming a composite core by implementing the process steps described below.

At 408, multiple mandrels can be inserted through corresponding multiple open cells, and, at 410, the composite fiber pre-form can be cured to form the composite core. Referring now also to FIG. 3, an example of a tool 350 to form the composite core from the composite fiber pre-form 308 is shown. Tool 350 is configured to produce a hexagonal shaped core member; however, tool 350 can be configured to provide any desirable shape. For example, alternative shapes of tool 350 can be configured to produce circular, square, rectangular, or even part customized core shapes.

In some implementations, multiple mandrels (for example, mandrel 352) are inserted into partial tool members 354a-354f in a pyramid shape. Each partial tool member 354a-354f can include apertures to control and tailor any thermal expansion of the partial tool member 354a-354f during the cure process. In some implementations, tool 350 includes a bladder 356 that is configured to inflate to provide a prescribed inward pressure upon the assembly of wrapped mandrels 352. However, it should be appreciated that the present disclosure contemplates other methods of providing pressure to the composite material wrapped around each mandrel 352 during the curing process, such as mechanical pressure generating devices.

In some implementations, curing pressure can be generated by the thermal expansion of the mandrels 352. In such an embodiment, tool 350 can include a rigid constraining structure in lieu of bladder 356. The heating of the mandrels 352 causes thermal expansion, which generates pressure at the composite material between mandrels 352.

Tool 350 can include a blower for generating an airflow and evenly distributing the airflow through the interiors of the multiple mandrels 352. In some implementations, a fluid, such as an oil, is circulated through the interiors of the multiple mandrels 352. The mandrels can be heated within tool 350 for a prescribed duration in accordance with the cure requirement of the composite system. An oven, or an internal conductive heating element, can be used to generate that requisite heat, for example. Airflow can improve the heating rate and heat distribution to the composite material around each mandrel 352, as such; it is particularly desirable to have an interior opening through each mandrel 352 that is sized to accommodate a prescribed amount of airflow. Bladder 356 can be controlled by a controller 358 so as to tailor the amount and timing of pressure exerted at the cell walls of composite material between mandrels 352 within tool 350. For RTM/VARTM processes, the "tools" may be different. The common thread may use mandrels in each of the cellular openings. In basic use, the dry pre-form may be saturated with resin (a two-part system as typically used in wet-layups), insert mandrels, and allow the block to cure. The mandrels may fit within the cells and create a tight fitting assembly.

Figure 8:
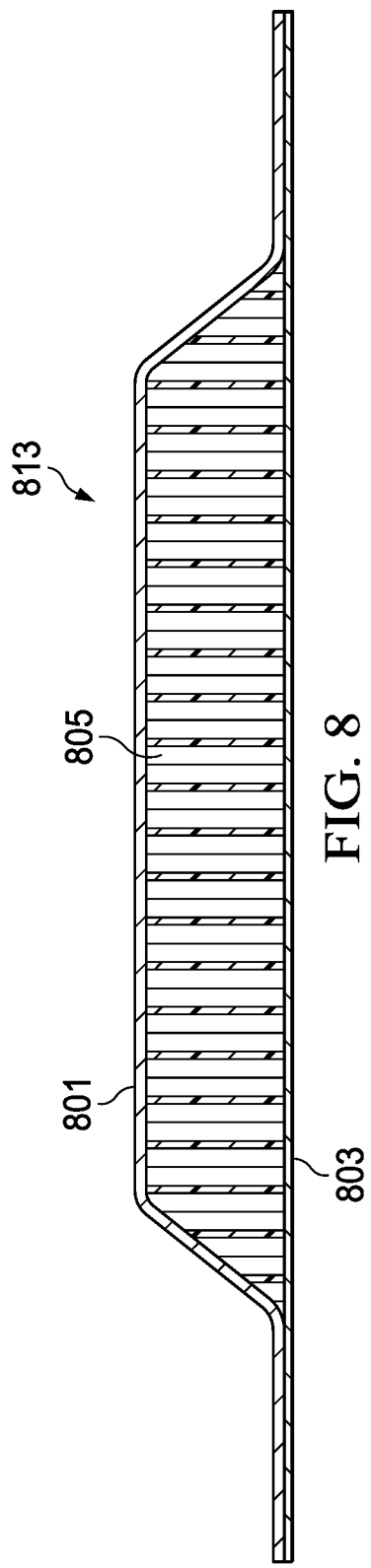
FIG. 8 shows a cross-sectional view of an example of a panel including the composite core.

FIG. 8 shows a cross-sectional view of an example of a panel 813 including the composite core. The panel 813 is illustrative of a wide variety of structures that can include a core member manufactured using the techniques described here. Panel 813 is a composite assembly that can include an upper skin 801, a lower skin 803, and a composite core 805, which can be manufactured similar to composite core 308 or other composite cores described above. Composite core 805 can be adhesively bonded to upper skin 801 and lower skin 803. The panel 813 can take on a wide variety of contours and configurations.

Figure 9:
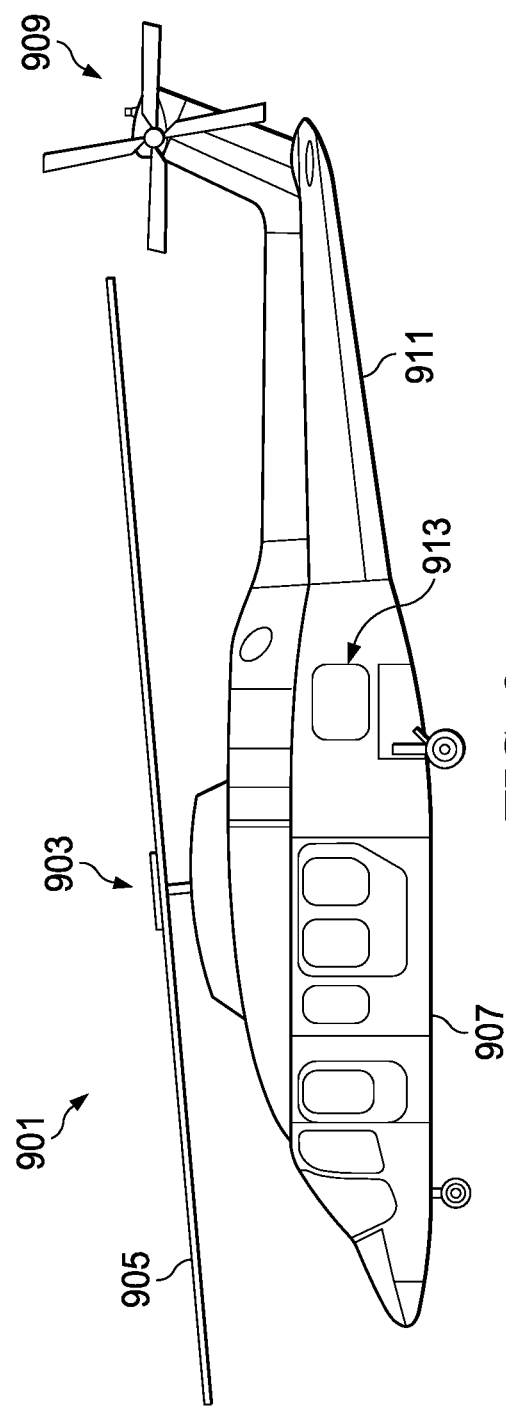
FIG. 9 shows a side view of an example of a rotorcraft.

FIG. 9 shows a side view of an example of a rotorcraft 901 that can include panels such as panel 813 or other panels that can include composite cores manufactured using the techniques described here. Rotorcraft 901 has a rotor system 903 with multiple rotor blades 905. The pitch of each rotor blade 905 can be managed in order to selectively control direction, thrust, and lift of rotorcraft 901. Rotorcraft 901 can further include a fuselage 907, tail rotor 909, and tail boom 911. Rotorcraft 901 is merely illustrative of the wide variety of aircraft, vehicles, and other objects that are particularly well suited to take advantage of the method and system of the present disclosure. It should be appreciated that other aircraft can also utilize the method and system of the present disclosure. Further, other vehicles and objects can utilize composite core manufactured by the system and method of the present disclosure. Illustrative embodiments can include wind turbine blades, sea based vehicles, radomes, enclosures, shelters, bridge decks, building facades, ground vehicles, rail vehicles, air vehicles, space vehicles, and manned or un-manned vehicles, to name a few.

Thus, particular implementations of the subject matter have been described. Other implementations are within the scope of the following claims.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A method comprising:
   forming a three-dimensional composite fiber pre-form by three-dimensionally weaving a plurality of composite fibers, the composite fiber pre-form comprising a plurality of open cells formed adjacent to and interlocked with each other, wherein a composite fiber forms at least a portion of a first side of a first open cell and at least a portion of a second side of a second open cell, the first open cell and the second open cell adjacent to and interlocked with each other, wherein the open cells of every adjacent pair of open cells of the plurality of open cells are interlocked with each other, wherein the interlocked cells are formed from a continuous fiber, wherein the plurality of composite fibers comprises a first set of fibers oriented in an XZ plane and a second set of fibers oriented in an XY plane, wherein forming the composite fiber pre-form comprises three-dimensionally weaving the second set of fibers through the first set of fibers to form the plurality of open cells in the XZ plane.

2. The method of claim 1 wherein the first set of fibers and the second set of fibers are oriented at an angle to each other.

3. The method of claim 2, wherein the angle is substantially 90 degrees or substantially 45 degrees.

4. The method of claim 1, wherein forming the three-dimensional composite fiber pre-form by three-dimensionally weaving the plurality of composite fibers comprises at an intersection of two sides of the first open cell:
   weaving a first subset of the second set of fibers to form a second side of the first open cell; and
   weaving a second subset of the second set of fibers to form the second side of the second open cell.

5. The method of claim 2, further comprising controlling a size of each open cell by controlling lengths of fibers in at least one of the first subset of the second set of fibers or the second subset of the second set of fibers.

6. The method of claim 1, wherein each cell of the plurality of open cells has a nested geometry cross-section.

7. The method of claim 6, wherein the nested geometry cross-section comprises at least one of a hexagon, a square, a triangle or a combination of at least two of the hexagon, the square or the triangle.

8. The method of claim 1, further comprising:
inserting a plurality of mandrels through corresponding plurality of open cells; and
curing the composite fiber pre-form over the plurality of mandrels.

9. The method of claim 8, wherein curing the composite fiber pre-form to the plurality of mandrels comprises introducing the composite fiber pre-form with resin.

10. A method comprising:
orienting a first set of composite fibers in a first direction;
orienting a second set of composite fibers in a second direction; and
three-dimensionally weaving the first set of composite fibers into the second set of composite fibers to form a three-dimensional composite fiber pre-form comprising a plurality of open cells formed adjacent to and interlocked with each other, wherein a composite fiber of the first set of composite fiber forms at least a portion of a side of each of a first open cell and a second open cell adjacent to and interlocked with the first open cell, wherein the open cells of every adjacent pair of open cells of the plurality of open cells are interlocked with each other, wherein the interlocked cells are formed from a continuous fiber, wherein the plurality of composite fibers comprises a first set of fibers oriented in an XZ plane and a second set of fibers oriented in an XY plane, wherein forming the composite fiber pre-form comprises three-dimensionally weaving the second set of fibers through the first set of fibers to form the plurality of open cells in the XZ plane.

11. The method of claim 10, wherein the first set of composite fibers is oriented at an angle to the second set of composite fibers.

12. The method of claim 11, wherein the angle is substantially 90 degrees or substantially 45 degrees.

13. The method of claim 10, wherein three-dimensionally weaving the first set of composite fibers into the second set of composite fibers to form the three-dimensional composite fiber pre-form comprises, at an intersection of two sides of the first open cell:
weaving a first subset of the first set of fibers to form another side of the first open cell; and
weaving a second subset of the first set of fibers to form another side of the second open cell.

14. The method of claim 13, further comprising controlling a size of each open cell by controlling lengths of fibers in at least one of the first subset or the second subset of the first set of fibers.

15. The method of claim 10, wherein each cell of the plurality of open cells has a nested geometry cross-section comprising at least one of a hexagon, a square, a triangle or a combination of at least two of the hexagon, the square or the triangle.

16. The method of claim 10, further comprising:
inserting a plurality of mandrels through corresponding plurality of open cells; and
curing the composite fiber pre-form to the plurality of mandrels.

17. A system comprising:
a three-dimensional composite fiber weaving machine;
a computer-readable medium storing instructions executable by one or more processors connected to the three-dimensional composite fiber weaving machine, the one or more processors configured to execute the instructions to cause the three-dimensional composite fiber weaving machine to perform operations comprising:
forming a three-dimensional composite fiber pre-form by three-dimensionally weaving a plurality of composite fibers, the composite fiber pre-form comprising a plurality of open cells formed adjacent to and interlocked with each other, wherein a composite fiber forms at least a portion of a first side of a first open cell and at least a portion of a second side of a second open cell, the first open cell and the second open cell adjacent to and interlocked with each other, wherein the open cells of every adjacent pair of open cells of the plurality of open cells are interlocked with each other, wherein the interlocked cells are formed from a continuous fiber, wherein the plurality of composite fibers comprises a first set of fibers oriented in an XZ plane and a second set of fibers oriented in an XY plane, wherein forming the composite fiber pre-form comprises three-dimensionally weaving the second set of fibers through the first set of fibers to form the plurality of open cells in the XZ plane.

18. The system of claim 17, wherein the first set of fibers and the second set of fibers are oriented at an angle to each other, wherein the angle is substantially 90 degrees or substantially 45 degrees.

* * * * *